(12) United States Patent
Sanders et al.

(10) Patent No.: US 9,557,205 B2
(45) Date of Patent: Jan. 31, 2017

(54) REDUNDANT LEVEL MEASURING SYSTEM

(75) Inventors: Don Patrick Sanders, Baton Rouge, LA (US); Michael J. Mulrooney, Batavia, IL (US); Boyce Carsella, Ingleside, IL (US)

(73) Assignee: Magnetrol International, Incorporated, Aurora, IL (US)

( * ) Notice: Subject to any disclaimer, the term of this patent is extended or adjusted under 35 U.S.C. 154(b) by 646 days.

(21) Appl. No.: 13/206,714

(22) Filed: Aug. 10, 2011

(65) Prior Publication Data
US 2012/0036927 A1    Feb. 16, 2012

Related U.S. Application Data

(60) Provisional application No. 61/372,149, filed on Aug. 10, 2010.

(51) Int. Cl.
*G01F 23/00* (2006.01)
*G01F 23/02* (2006.01)

(52) U.S. Cl.
CPC .................... *G01F 23/02* (2013.01)

(58) Field of Classification Search
CPC ....... G01F 23/366; G01F 23/686; G01F 23/28
See application file for complete search history.

(56) References Cited

U.S. PATENT DOCUMENTS

| | | |
|---|---|---|
| 2,720,785 A | 10/1955 | Sedgwick |
| 3,668,553 A * | 6/1972 | Dunn et al. ............. 331/107 SL |
| 3,964,312 A | 6/1976 | Sebek |
| 4,457,171 A | 7/1984 | Gebauer |
| 4,483,193 A | 11/1984 | Bonetti |
| 4,695,796 A | 9/1987 | Omet et al. |
| 4,870,862 A | 10/1989 | Bonetti |
| 5,097,703 A | 3/1992 | Peter |
| 5,103,674 A | 4/1992 | Outwater et al. |
| 5,136,884 A | 8/1992 | Lovett |
| 5,267,474 A * | 12/1993 | Ten Hoven ................. 73/290 R |
| 5,299,456 A | 4/1994 | Steiner |
| 5,743,137 A | 4/1998 | Brown et al. |
| 6,062,095 A | 5/2000 | Mulrooney et al. |
| 6,067,854 A | 5/2000 | Yang |
| 6,253,611 B1 | 7/2001 | Varga et al. |
| 6,588,272 B2 | 7/2003 | Mulrooney et al. |

(Continued)

FOREIGN PATENT DOCUMENTS

SU      767532      7/1978

*Primary Examiner* — Laura Martin
*Assistant Examiner* — Alex Devito
(74) *Attorney, Agent, or Firm* — Wood, Phillips, Katz, Clark & Mortimer

(57) ABSTRACT

A redundant level measuring system comprises a chamber for fluidic coupling to a process vessel whereby material level in the vessel equalizes with material level in the chamber. A float including a magnet in the chamber rises and falls with material level in the chamber. A magnet actuated visual indicator is mounted to the chamber for indicating level of the magnet in the chamber. A measurement instrument includes an antenna and a measurement circuit. The instrument is mounted atop the chamber with the antenna extending downwardly into the chamber. The measurement circuit measures time of flight of a through air signal representing level of the material in the chamber. A shield in the chamber isolates the float from the antenna.

19 Claims, 8 Drawing Sheets

(56) References Cited

U.S. PATENT DOCUMENTS

| | | | |
|---:|---|---|---|
| 7,102,584 B2* | 9/2006 | Janitch et al. | 73/290 R |
| 2002/0126273 A1* | 9/2002 | Carsella et al. | 356/73.1 |
| 2008/0210003 A1* | 9/2008 | Schulz | 73/290 V |
| 2010/0123615 A1* | 5/2010 | Fehrenbach | H01Q 19/08 |
| | | | 342/124 |

* cited by examiner

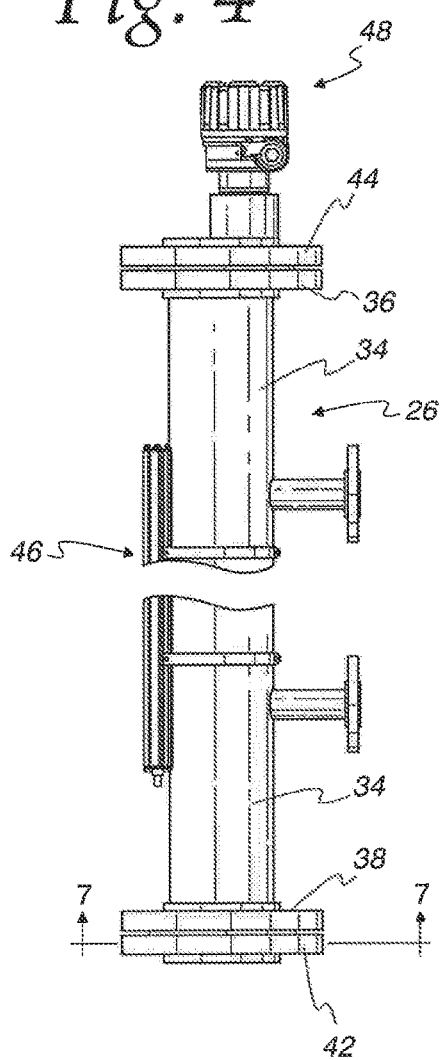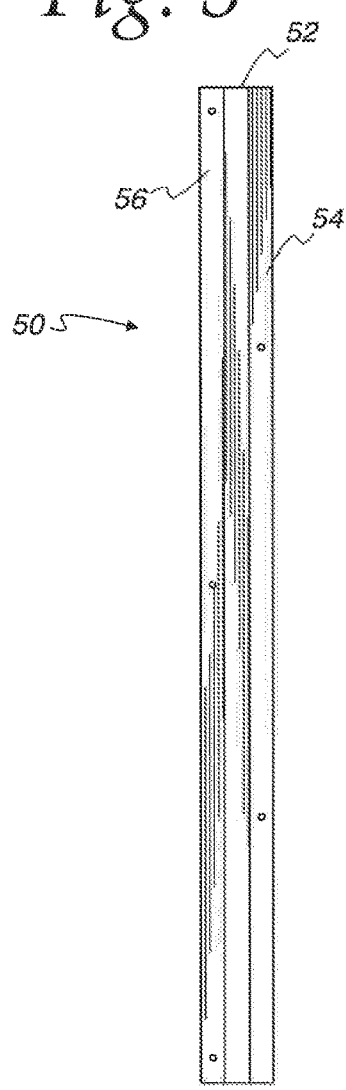

REDUNDANT LEVEL MEASURING SYSTEM

CROSS-REFERENCE TO RELATED APPLICATIONS

This application claims priority of provisional application No. 61/372,149 filed Aug. 10, 2010.

FEDERALLY SPONSORED RESEARCH OR DEVELOPMENT

Not Applicable.

MICROFICHE/COPYRIGHT REFERENCE

Not Applicable.

FIELD OF THE INVENTION

This invention relates to a level measuring system and, more particularly, to a redundant level measuring system.

BACKGROUND

Numerous technologies exist for measuring level of liquids or solids in an industrial process environment. Among these are transmitters which measure the level and transmit a signal representing actual level. The techniques for measuring level include through air radar, guided wave radar, magnetostrictive, capacitance and the like.

A magnetic level indicator is another type of commonly used level sensing device. A magnetic level indicator, also known as a flipper gauge, is constructed of a chamber, a float and a visual indicator. The chamber, also known as a cage, is essentially a pipe or similar device external to a process tank or vessel which is usually mounted vertically and which is usually connected to the tank through two or more horizontal pipes. One of the horizontal pipes is near the bottom of the chamber and the other is near the top of the cage. This arrangement allows the material level in the chamber to equalize with the material level in the tank, largely isolating the cage from agitation, mixing or other activities in the tank. The chamber, which is usually a pressure vessel, can be isolated from the tank using valves. The float is sized and weighted for the specific gravity and pressure of the application and contain magnets which actuate a visual indicator on the outside of the chamber to indicate level.

In certain applications it is desirable to transmit a level signal to a remote device in addition to the local visual indication of a magnetic level indicator. Currently, magnetic level indicators are used with magnetostrictive transmitters or with a series of reed switches, either of which provides an indication of continuous level which is redundant to the primary visual indication provided by the magnetic level indicator. Both the magnetostrictive and reed switch sensors are located on and external to the chamber and are actuated by the magnet placed inside the float in the chamber. A significant drawback to these redundant systems is that the float may fail, in which case both the primary visual and secondary transmitter signals are lost.

The present invention is directed to overcoming one or more of the problems discussed above in a novel and simple manner.

SUMMARY

In accordance with the invention, a redundant level measuring system includes a through air measurement instrument with an antenna mounted in the chamber.

Broadly, there is disclosed herein a redundant level measuring system comprising a chamber for fluidic coupling to a process vessel whereby material level in the vessel equalizes with material level in the chamber. A float including a magnet in the chamber rises and falls with material level in the chamber. A magnet actuated visual indicator is mounted to the chamber for indicating level of the magnet in the chamber. A measurement instrument includes an antenna and a measurement circuit. The instrument is mounted atop the chamber with the antenna extending downwardly into the chamber. The measurement circuit measures time of flight of a through air signal representing level of the material in the chamber. A shield in the chamber isolates the float from the antenna.

In accordance with one aspect of the invention, a redundant level measuring system comprises a chamber for fluid coupling to a process vessel whereby material level in the vessel equalizes with material level in the chamber. An elongate partition in the chamber defines a float space and an open space. A float including a magnet is in the chamber float space for rising and failing with material level in the chamber. A magnet actuated visual indicator is mounted to the chamber for indicating level of the magnet in the chamber. A through air measurement instrument includes an antenna and a measurement circuit. The instrument is mounted atop the chamber with the antenna directed downwardly to the chamber open space. The measurement circuit generates and receives a frequency signal using a radiating element supported proximate the antenna. The measurement circuit measures level of the material in the chamber.

It is a feature of the invention that a body supports the radiating element in the housing proximate the antenna for rotation at any angular orientation.

It is another feature of the invention that the body comprises a substrate rotatably mounted in the housing so that the radiating element can be independently oriented relative to a process vessel. The substrate may comprise a circuit board.

It is a further feature of the invention that a feed bearing is attached to the body operatively engaging a feed end of the antenna so that the body is free to rotate in the housing guided by the antenna.

It is a further feature of the invention that the partition physically isolates the open space from the float.

It is yet another feature of the invention that the measurement instrument comprises a micropower impulse radar instrument.

It is still another feature of the invention that the antenna comprises an antenna horn.

It is still a further feature of the invention that the antenna comprises a dielectric rod antenna and the radiating element comprises a loop launcher.

It is still another feature of the invention that the radiating element comprises an oscillator circuit including micro strip resonators.

There is disclosed in accordance with a further aspect of the invention a redundant level measuring system comprising a chamber for fluidic coupling to a process vessel whereby material level in the vessel equalizes with material level in the chamber. An elongate partition in the chamber defines a float space and an open space. A float includes a magnet in the chamber float space for rising and falling with material level in the chamber. A magnet actuated visual indicator is mounted to the chamber for indicating level of the magnet in the chamber. A through air radar measurement instrument includes a housing. An antenna is secured to the housing. A process adaptor is associated with the antenna and the housing for securing the instrument to the chamber to define a process seal and with the antenna directed to the chamber open space. The control in the housing generates or receives a high frequency signal. The control comprises an electromagnetic radiating element. A body supports the radiating element proximate the antenna for rotation at any angular orientation without effecting the process seal.

Other features and advantages will be apparent from a review of the entire specification, including the appended claims and drawings.

BRIEF DESCRIPTION OF THE DRAWINGS

FIG. 4 is a side elevation view of the measuring system of FIG. 2;

FIG. 5 is an elevation view of a partition of the measuring system of FIG. 2;

DETAILED DESCRIPTION

Figure 1:
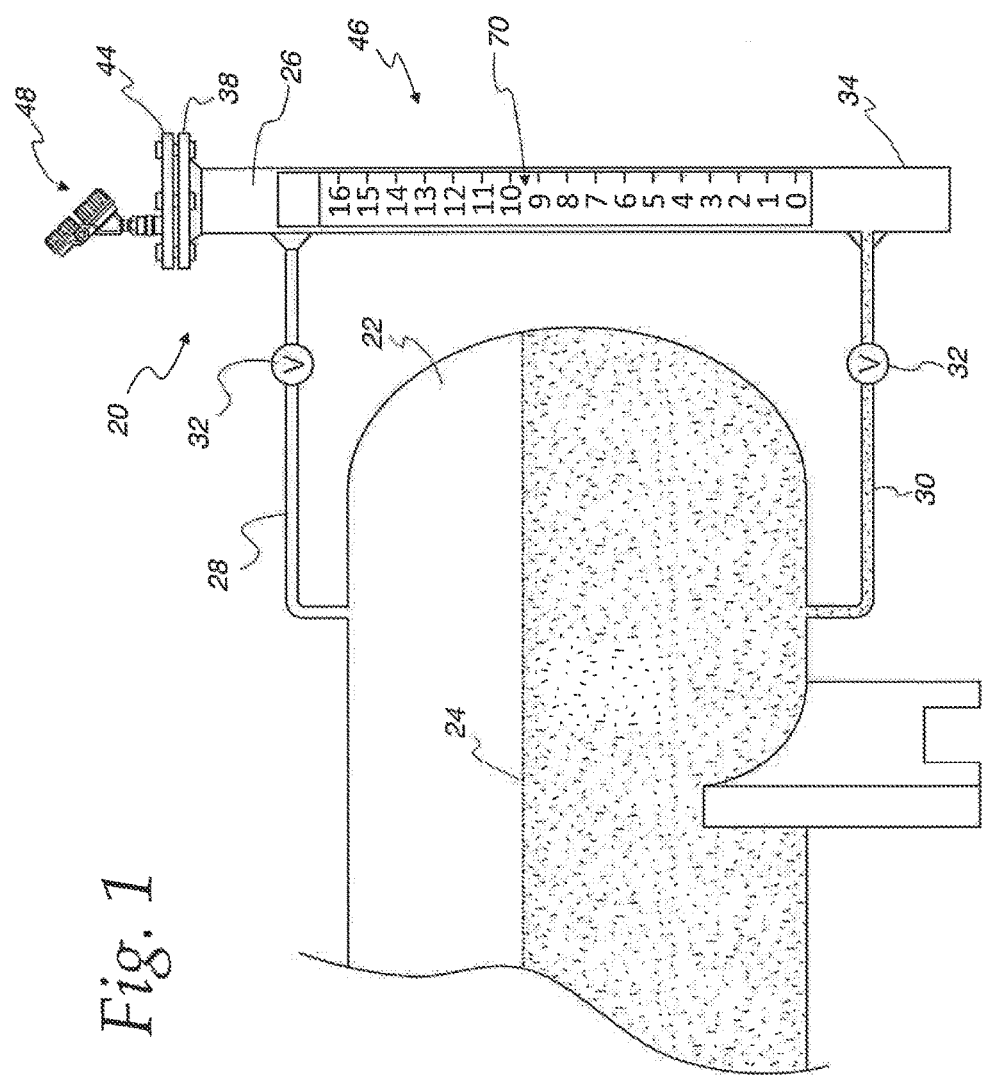
FIG. 1 is an elevation view of an exemplary redundant level measuring system in accordance with the invention mounted to a process vessel.

An exemplary redundant level measuring system 20 in accordance with the invention is shown in FIG. 1. The redundant level measuring system 20 is used for providing redundant level measurement of a tank or vessel 22 having a material 24, the level of which is to be sensed. The level measuring system includes a chamber 26 for fluidic coupling to the vessel 22 via a first horizontal pipe 28 near the top of the vessel 22 and a second horizontal pipe 30 near the bottom of the vessel 22. The vessel 22 can be isolated from the chamber 26 using valves 32 in each of the top pipe 28 and the bottom pipe 30.

Figure 2:
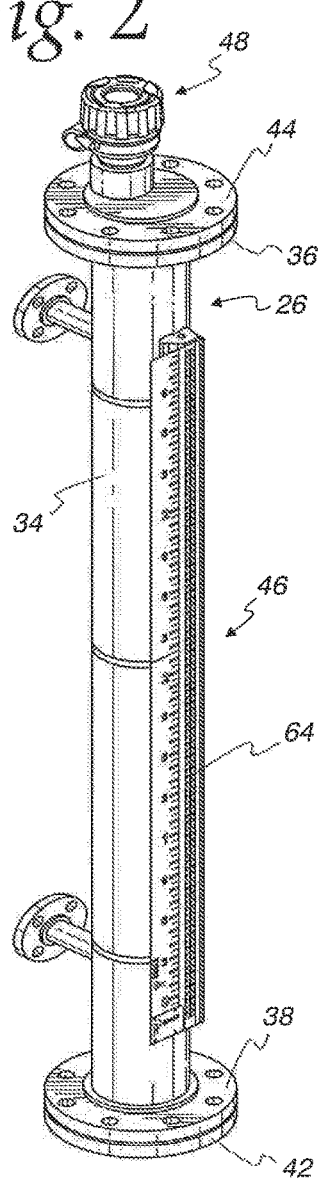
FIG. 2 is a perspective view of a redundant level measuring system in accordance with a first embodiment of the invention.
Figure 3:
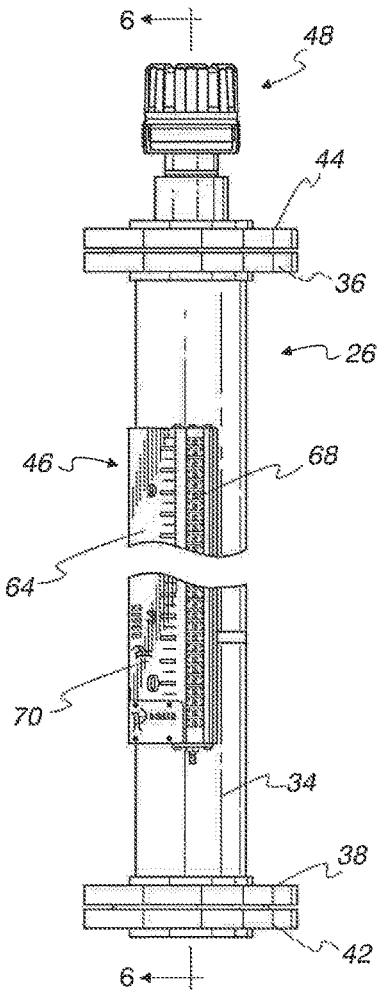
FIG. 3 is a front elevation view of the measuring system of FIG. 2.
Figure 6:
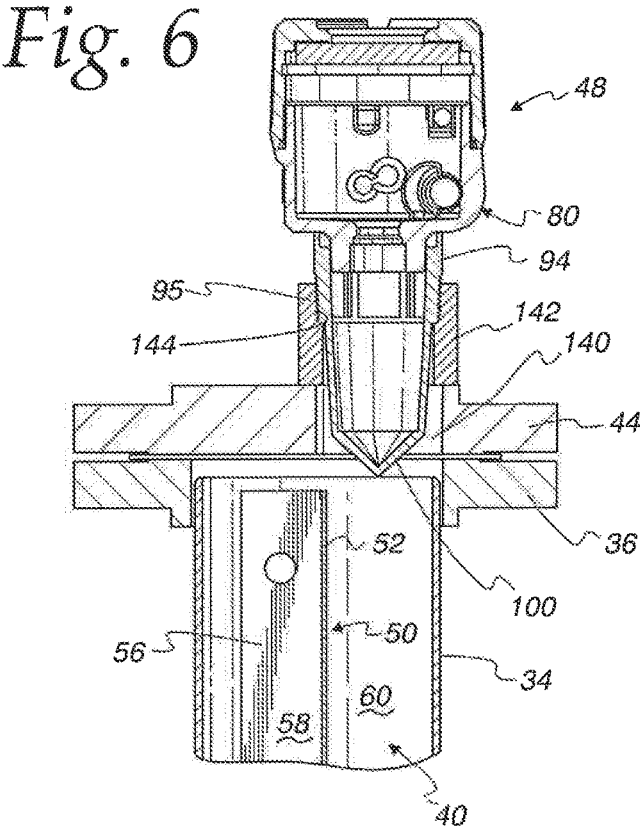
FIG. 6 is a section view taken along the line 6-6 of FIG. 3.
Figure 7:
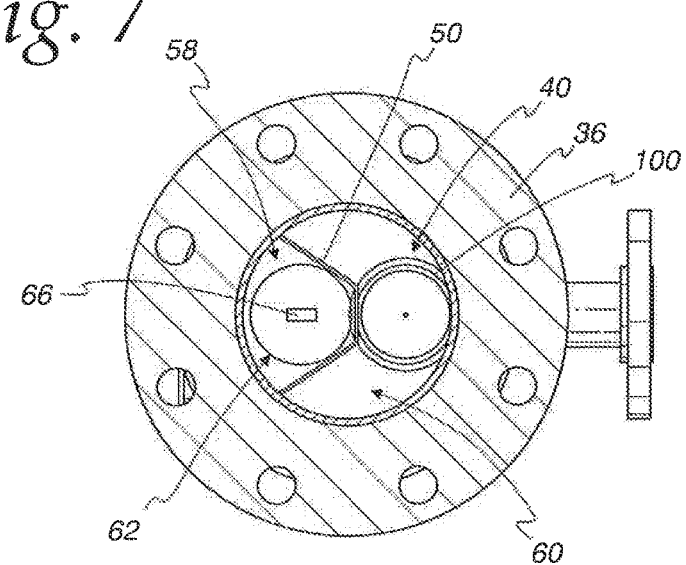
FIG. 7 is a sectional view taken along the line 7-7 of FIG. 4.

Referring to FIGS. 2-4, the chamber 26 comprises an elongate pipe 34 having a top flange 36 and a bottom flange 38 to define an interior space 40, see FIGS. 6 and 7. A bottom plate 42 is secured to the bottom flange 38 to close a bottom end of the interior space 40. A top plate 44 is secured to the top flange 36 to close the top of the interior space 40. The described arrangement allows the material level in the vessel 22 to equalize with the level in the chamber 26 while largely isolating the chamber 26 from agitation, mixing or other activities in the vessel 22.

In accordance with the invention, the redundant level measuring system 20 comprises a magnetic level indicator 46 and a level transmitter 48.

Referring to FIG. 5, a partition 50 comprises a formed metal plate having a center wall 52 connected to opposite side walls 54 and 56. The partition 50 has a length corresponding to length of the pipe 34. The partition 50 is received in the chamber interior space 40, see FIGS. 6 and 7, to define a float space 58 on one side of the partition 50 and an open space 60 on an opposite side of the partition 50.

The magnetic level indicator 46 includes a float 62, see FIG. 7, in the chamber float space 58, and an external visual indicator 64. The float 62 rides up and down in the chamber 26 with the surface of the material 24. The float 62 is typically hollow so that it rides freely on the surface of the material 24. The float 62 may be made of stainless steel or the like and houses a magnet 66 adapted to be positioned at the surface of the material 24. As such, the float 62 is also referred to as a magnetic float. The float 62 is sized and weighted for the specific gravity and pressure of the application. The visual indicator 64 is strapped to the chamber 26 and is totally isolated from the process material 24. The visual indicator 64 includes rotating flags 68. Each flag 68 contains an alignment magnet which reacts to the float magnet 68 and protects against false actuation. With raising level, the flags 68 rotate, changing color. The flags 68 are positioned alongside graduated markings 70 on the visual indicator 64 to indicate level of a material 24.

The transmitter 48 comprises a through air radar measurement instrument. Such a transmitter may be as generally described in Gard, Ser. No. 12/321,959, filed Jan. 27, 2009, owned by the assignee of the present application, the specification of which is hereby incorporated by reference herein.

As described therein, the transmitter uses micro power impulse radar (MIR) in conjunction with equivalent time sampling (ETS) and ultra-wideband (UWB) transceivers for measuring a level using time domain reflectometry (TDR). Particularly, the instrument uses through air radar for sensing level. While the embodiments described herein relate to an MIR level sensing apparatus, various aspects of the invention may be used with other types of process control instruments for measuring various process parameters, such as a rangefinder, as will be apparent to those skilled in the art.

The instrument 48 uses pulse-burst radar technology with ETS circuitry. Short bursts of microwave energy are emitted and subsequently reflected from a surface. The distance is calculated by the equation $$D = (\text{velocity of EM propagation}) * \text{transit time(round trip)}/2.$$

Level is then calculated by applying a tank height value. ETS is used to measure the high speed, low power electromagnetic (EM) energy. The high speed EM energy (1,000 ft/Φs) is difficult to measure over short distances and at the resolutions required in the process control industry. ETS captures the EM signals in real time (nanoseconds) and reconstructs them in equivalent time (milliseconds), which is much easier to measure. ETS is accomplished by scanning the vessel to collect thousands of samples. The round trip event on a 65 ft. tank takes only 133 nanoseconds in real time. After it is reconstructed in equivalent time it measures 200 milliseconds.

The radar signal produced by the instrument 48 can interact with the magnetic float. In accordance with the invention, the partition 50 is provided in the chamber for isolating the magnetic float from the antenna.

Figure 8:
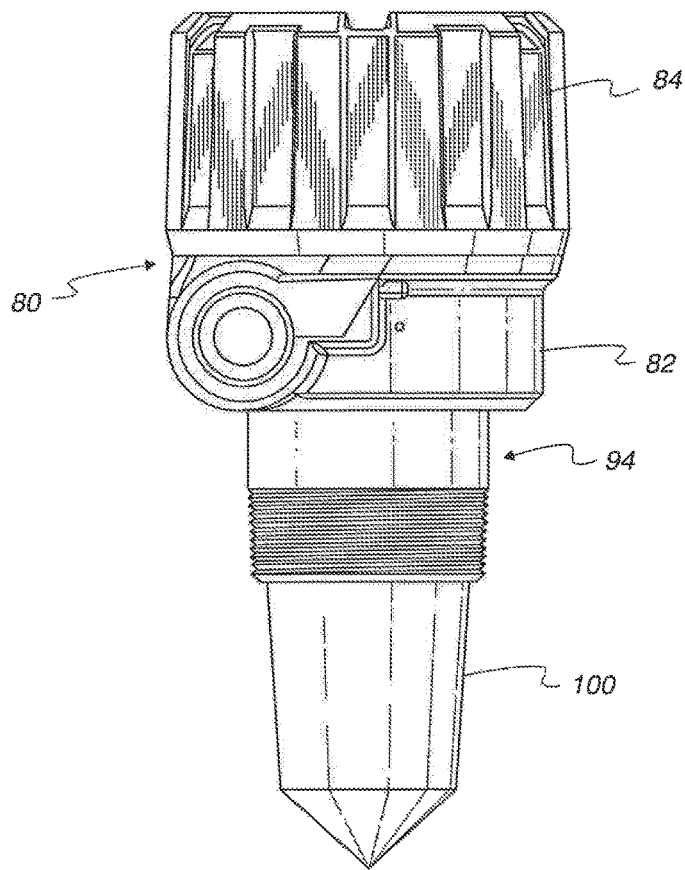
FIG. 8 is an elevation view of the through air measurement instrument for the redundant level measuring system of FIG. 2.
Figure 9:
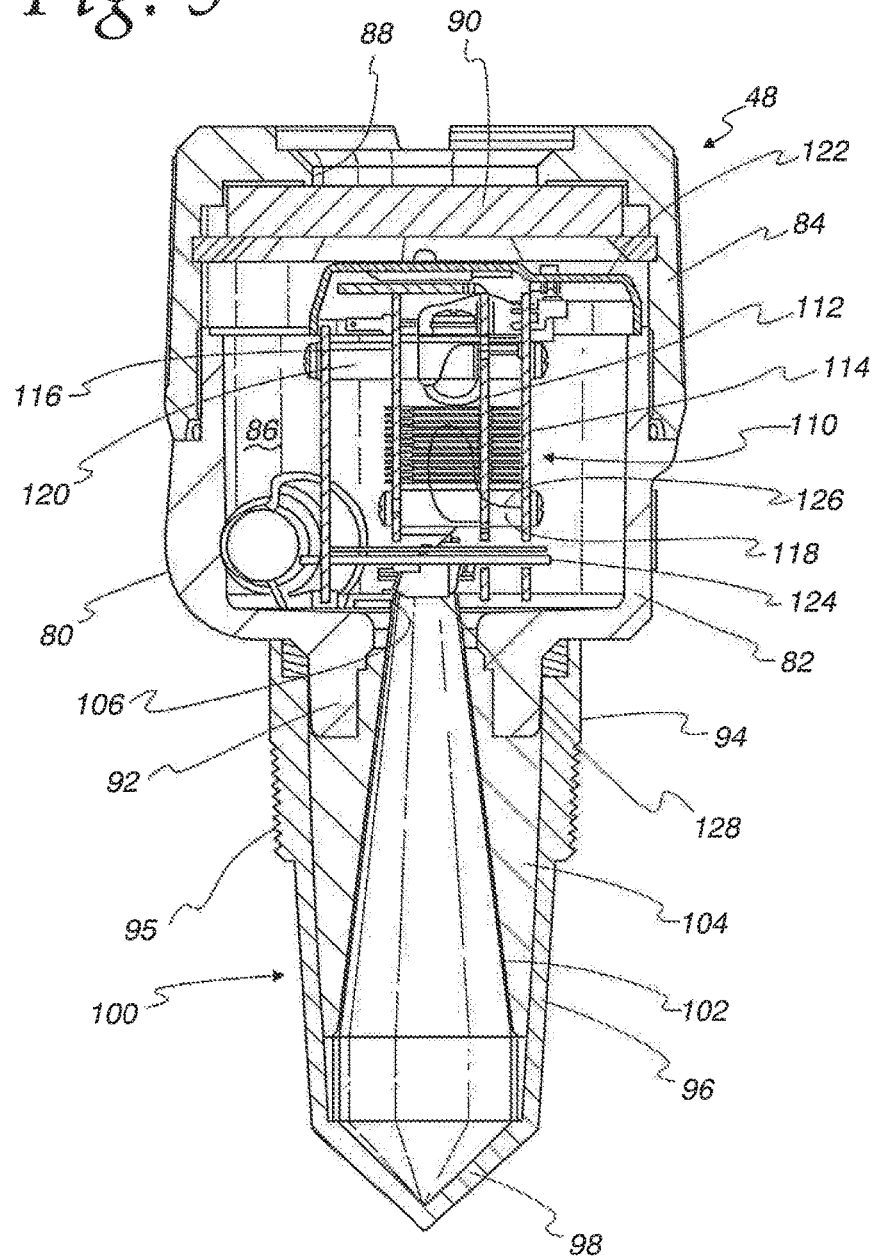
FIG. 9 is a sectional view of the through air measurement instrument of FIG. 8.

Referring particularly to FIGS. 8 and 9, the transmitter 48 includes a housing 80. The housing 80 comprises a base 82 and a cover 84 threaded to the base 82 to define an enclosed space 86. The cover 84 has a top opening 88 closed by a glass plate 90. A bottom of the base 82 includes a downwardly depending neck 92. The neck 92 is receivable in a process adaptor 94. The process adapter 94 includes threads 95 and is generally cylindrical and connects to an antenna housing 96 narrowing downwardly from the housing 80 to a conical closed end 98. In the illustrated embodiment, the process adapter 94 and antenna housing 96 comprise a unitary structure.

An antenna 100 comprises an antenna horn 102 embedded in potting compound 104 within the antenna housing 96 and process adapter 94. The potting compound 104 also serves to permanently and rigidly attach the process adaptor 94 to the housing base 82. The antenna horn 102 includes an upper feed end 106 that projects into the housing space 86.

A control 110 in the housing space 86 generates or receives a high frequency signal, as described below. The control 110 comprises a mounting bracket 112 fixedly secured to the base 82 in any known manner. First and second main circuit boards 114 and 116 are fixedly secured to the bracket 112 using fasteners 118 and 120, respectively. A bezel 122 is secured in the housing. A rotating RF transceiver circuit board 124 is rotationally mounted relative to the fixed mounting bracket 112, and thus antenna horn 102, and is electrically connected to the first main circuit board 118 by a flexible cable 126.

An antenna feed bearing 128 extends downwardly from the transceiver circuit board 124 and is sized to be telescopically received in the antenna horn feed end 106. The feed bearing 128, and thus the transceiver circuit board 124, are free to rotate about a vertical axis, guided by the antenna horn 102.

The main circuit boards 114 and 116 include electrical circuitry for supplying power to the control 110, and a control circuit to provide measurement functions, display control, configuration, general operation and the like for sensing level and interfacing with other peripherals and control equipment, as is well known to those skilled in the art. The particular circuitry does not form part of the present invention and is not described in detail herein.

The transceiver circuit board 124 contains the necessary circuitry to produce a microwave signal, transmit the signal to a liquid or other surface, receive and process the radar return signal into a so-called Avideo@ wave form from which the locations of the radar echoes can be determined. In the illustrated embodiment of the invention, the main circuitry generates and sends to the transceiver circuit board 124 control signals such as time variable gain, window, run/stop and end of ramp that control the radar scanning process.

As described in the '959 application, a main oscillator circuit generates a square wave. The main oscillator is a crystal controlled oscillator with a typical frequency in the 3-5 MHz range. The frequency may be on the order of 3.6864 MHz. A divide-by-two circuit produces a pulse repetition frequency of 1.8432 MHz. This is done to reduce the power requirement in delay locked loop (DLL) logic gates, A DLL timing circuit generates a precise, controlled timing delay between two logic transitions, referred to as transmit, or TX, pulse and receive, or RX, pulse. The transitions are on the order of 0 to approximately 100 nanoseconds, according to the value of a ramp signal input from a ramp generator. The delay lock loop in conjunction with a sampling detector performs the function of equivalent time sampling on the transmitted RF signal in accordance with previous, well known designs.

A transmit pulse generator and a receive pulse generator are controlled by the DLL timing circuit and use a single high-frequency switching transistor to generate a very fast, less than one nanosecond, pulse to excite a harmonic oscillator. The TX pulse creates the transmit pulse out the antenna 100 towards the radar target, such as a liquid level surface. The RX pulse is delayed from the TX pulse by an amount determined by the ramp generator and the DLL timing circuit. The purpose of the RX pulse is to gate the sampling detector and listen for TX pulses which have been reflected by a distant target, and have returned to the antenna 100 after a delay dependent on the target distance.

The harmonic oscillator represents a Colpitts oscillator comprised of a high frequency HJFET and tuned via microstrip resonators to oscillate at approximately 13 GHz while being rich in second harmonic (26 GHz) content. It is primarily the 26 GHz component that is transmitted. This allows the use of smaller antennas which achieve smaller radiated beam widths.

The antenna 100 is not electrically connected to the circuit 124. Instead, the antenna 100 uses an antenna horn 102 that is placed over the oscillator transistor and microstrips of the harmonic oscillator, as generally depicted in FIG. 9, whereby the RF energy from the harmonic oscillator is directly coupled into the antenna horn 102 after radiating directly from the circuit elements themselves. As is apparent, a wave guide could also be used with, or instead of, the antenna horn 102.

The sampling detector comprises a microwave diode that is placed inside the antenna horn 102 proximate the harmonic oscillator. TX pulses that are reflected by the liquid surface are received by the antenna 100 and conducted to the sampling diode where they are mixed and detected with the delayed RX pulse to perform the equivalent time sampling function. A preamp comprises a fixed gain stage to amplify signal from the sampling detector. A variable gain bandpass amplifier comprises a bandpass amplifier tuned to the frequency of the video or down-converted signal which is a result of the equivalent time sampling process. Also, the amplifier provides a variable gain, as controlled by the signal Atime variable gain@. In radar, since the strength of echoes decreases with increasing distance, a time variable gain circuit is used to increase the gain of the receiver with increasing distance from the transmitter to offset the effect of diminishing radar signal strength with distance.

Thus, the circuitry on the transceiver circuit board 124 operates to generate the transmission signal and the signal is launched directly from the transceiver circuit board 124. By rotating the transceiver circuit board 124, the signal pattern from the harmonic oscillator can be oriented. This allows the assembly of the housing 80 and process adaptor 94 with the antenna 100 to be installed in any rotational direction in the chamber 26 simplifying the installation process. Also, the RF signal is generated on the transceiver circuit board 124 directly into the antenna horn 102 without the need of multiple intermediate components. The bearing 128 allows the transceiver circuit board 124 to rotate relative to the housing 80.

In the illustrated embodiment of the invention, an electromagnetic radiating element comprises the transistor and microstrip resonators of the harmonic oscillator. The invention is not limited to such radiating element, but could alternatively use other elements, such as a loop launcher or the like. Moreover, the characteristics of the propagation signal described herein are by way of example only. The invention is not intended to be limited to any particular frequency or wavelength.

Referring to FIG. 6, the top plate 44 includes a circular opening 140 located above the chamber open space 60. A collar 142 is secured atop the top plate 44 surrounds the opening 140. The collar includes internal threads 144 for threadable receiving the process adaptor threads 95. As such, the antenna 100 is directed downwardly to the chamber open space 60, as shown in FIG. 7.

The partition 50 physically isolates the open space 60 from the float space 62. This prevents the instrument 48 from sensing the float 62. Instead, the instrument 48 senses the material level in a conventional manner.

Radar level devices exhibit predictable results when used in standard, circular wave guides. Energy transmitted from the antenna couples nicely to the interior of the wave guide and propagates smoothly until encountering an impedance mismatch created by a medium with a significantly different dielectric. Measurement is complicated for non-contact radar due to the use of the internal partition 50 resulting in a non-standard wave guide as shown in FIG. 7. This irregular shape presents challenges to propagating microwave energy with respect to proper polar alignment, propagation velocity and propagation notes. The propagation of a microwave signal involves the transmission of the electrical ("E") and magnetic ("H") fields. In practice, a receiver will tend to respond to radar targets that lie in the E field plane more than the H field plane, which are perpendicular to each other. Proper alignment of the E and H fields optimize the application by allowing optimum response to desired targets and minimal response to false targets. By using the rotating transceiver circuit board 124, the ability to properly align the H field is enhanced. This allows polar alignment while leaving the antenna 100 and the transmitter housing 80 in place and unchanged in their orientation. Proper alignment is achieved when the radar signal propagates cleanly and uniformly inside the open space 60 and does not produce cancellations, ghosts, pulse distortions, etc., which can all be side effects of incorrect signal propagation in the wave guide. As is apparent, the particular orientation will depend on the size and shape of the wave guide.

The radiation pattern of a typical tank level radar includes the so-called 'E' (electric) and "H" (magnetic) fields. These fields are oriented at a right angle (90°) to each other. However, the transmitter's detector (receiver) responds to the electric (E field) component of the signal.

Figure 12:
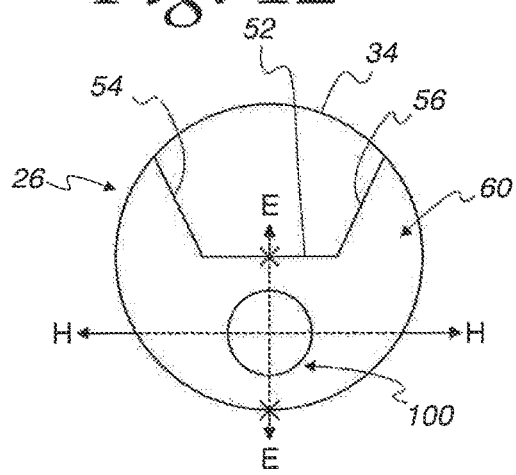
FIGS. 12 and 13 illustrate orientation patterns for electrical and magnetic fields.

When the radar scene is not symmetrical (uniform in all directions), the orientation of the E field relative to the radar scene gives rise to the "polarization" effect; that is, the radar's detected signal will vary as a function of the orientation (polarization) of the E field relative to the object(s) in the radar's beam. In the case of a radar transmitter installed in the chamber 26, one can see that the chamber 26 is not symmetrical. In the top view shown in FIG. 12, if the transmitter 48 was oriented so that its E field is perpendicular to the walls 34 of the chamber 26 and the partition center wall 52, there will be an undesirable "multipath" effect as a result of the E field having two direct paths from the radar transmitter, to the liquid surface and back. The first is the direct reflection from the transmitter 48, to the surface and back. The second would be from the transmitter 48, off either the side wall 38 or the partition center wall 52 to the surface, and then back to the transmitter 48. Because microwaves of this frequency have wavelengths of only a couple inches or less, there will be strong cancellation effects at certain liquid levels due to the destructive effect of the delayed multipath signal subtracting from the direct reflected signal. The result would be "nulls" or signal dropouts at several levels in the chamber 26.

Figure 13:
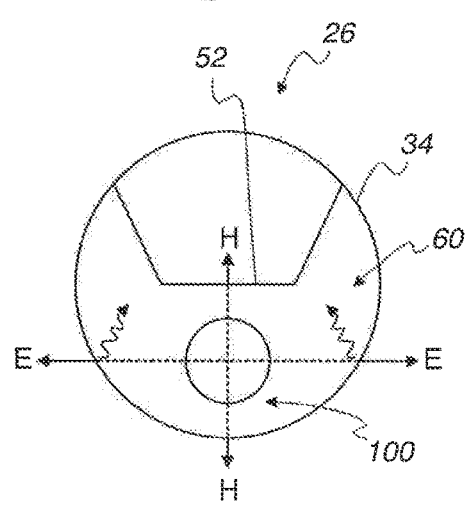

In the view shown in FIG. 13, the transceiver circuit board 124 has been rotated no that the E field is no longer perpendicular to any surfaces that are orthogonal to the beam. When the E field is positioned as shown in FIG. 13, the beam will "deflect", or scatter, off the angled surfaces of the chamber 26. As the beam scatters its reflected amplitude to the transmitter 48 is greatly attenuated. In this case the strong multipath interferences in the first case have been avoided, and nulls in the signal strength will not be observed. The signal amplitude reflected from the surface will be much more uniform over the length of the chamber 26 and will not be subject to interferences and dropouts.

Figure 10:
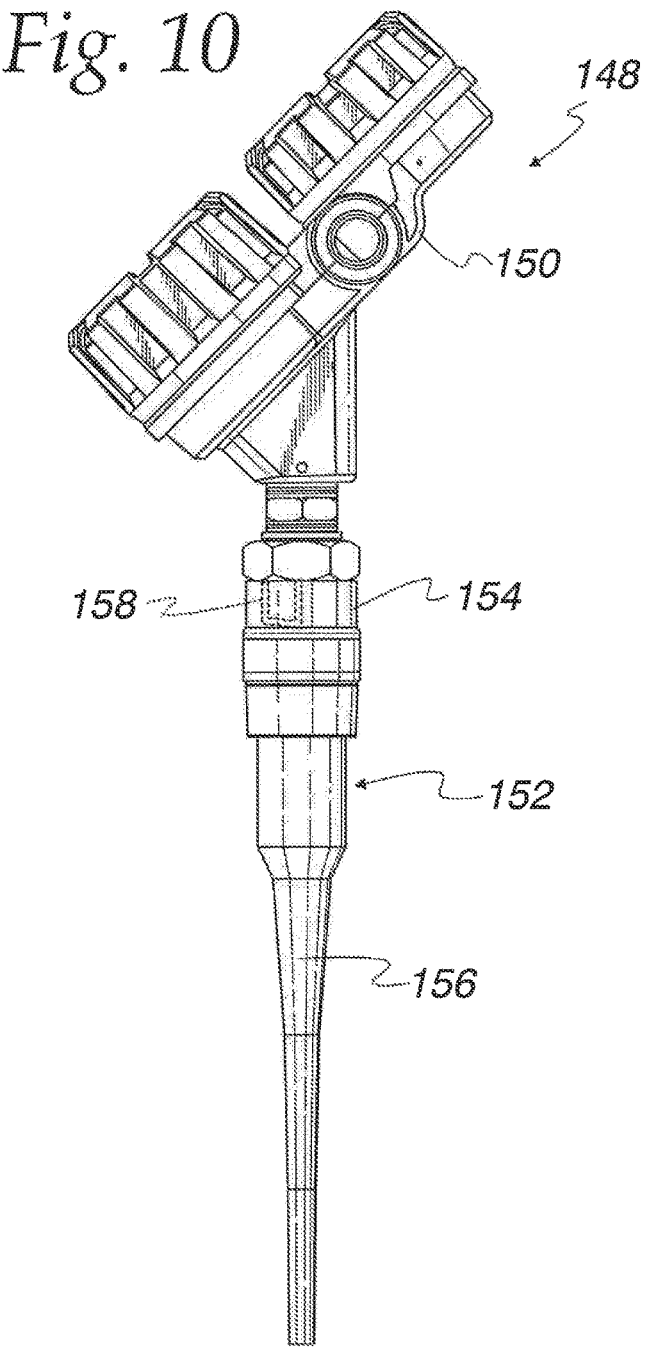
FIG. 10 is an elevation view of an alternative through air measurement instrument for a redundant level measuring system according to the invention.
Figure 11:
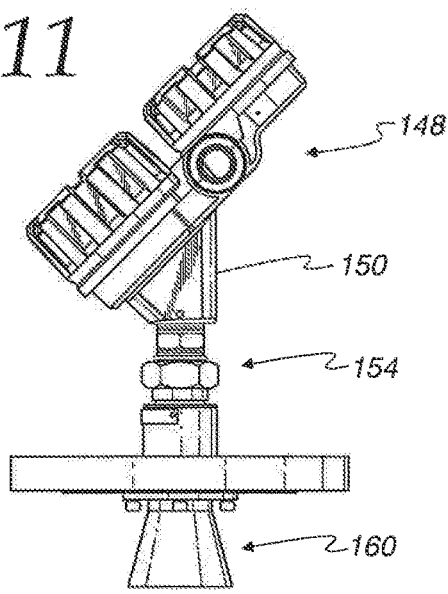
FIG. 11 is an elevation view of a further alternative through air measurement instrument for a redundant level measuring system according to the invention.

FIG. 10 illustrates another through air radar level transmitter 148 which can be used as an alternative to that shown in FIG. 9. Such a transmitter may be as generally described in Janitch et al. U.S. Pat. No. 7,106,248, owned by the assignee of the present application, the specification of which is hereby incorporated by reference herein. The transmitter 148 includes a control housing 150, an antenna 152 and a universal connector 154 for connecting the antenna 152 to the housing 148. The antenna 152 comprises a dielectric rod 156. A loop launcher 158 is located in the connector 154. The universal connector 154 allows for the loop launcher 158 to be rotated independently of the antenna 152 and the housing 150. Alternatively, the transmitter 148 may use a horn antenna 160, such as shown in FIG. 11.

As is apparent, other forms of though air transmitters may be used in connection with the redundant level measurement system in accordance with the invention. For example, the transmitter could instead be an ultrasound transmitter including a source and a transducer, as is known.

As is apparent, the shape of the chamber may be different from that shown. Likewise, the chamber may be connected to the vessel by only one pipe. The vessel may be pressurized or nonpressurized. The present invention is not directed to any particular tank or vessel configuration or chamber configuration.

Thus, in accordance with the invention, there is provided a redundant level measuring system comprising a through air radar measuring transmitter and a magnetic level indicator.

It will be appreciated by those skilled in the art that there are many possible modifications to be made to the specific forms of the features and components of the disclosed embodiments while keeping within the spirit of the concepts disclosed herein. Accordingly, no limitations to the specific forms of the embodiments disclosed herein should be read into the claims unless expressly recited in the claims. Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A redundant level measuring system comprising:
   a chamber for fluidic coupling to a process vessel whereby material level in the vessel equalizes with material level in the chamber;
   an elongate partition in the chamber defining a float space and an open space;

a float including a magnet in the chamber float space for rising and falling with material level in the chamber;

a magnet actuated visual indicator mounted to the chamber for indicating level of the magnet in the chamber;

a through air measurement instrument including a housing, an antenna mounted to the housing, a measurement circuit in the housing including a radiating element, and a body supporting the radiating element in the housing proximate the antenna for rotation relative to the housing and the antenna, the instrument being mounted atop the chamber with the antenna directed downwardly to the chamber open space, and the measurement circuit generating and receiving a frequency signal using the radiating element, the measurement circuit measuring level of the material in the chamber.

2. The redundant level measuring system of claim 1 further comprising the body supporting the radiating element in the housing proximate the antenna for rotation at any angular orientation.

3. The redundant level measuring system of claim 2 wherein the body comprises a substrate rotatably mounted in the housing so that the radiating element can be independently oriented relative to a process vessel.

4. The redundant level measuring system of claim 3 wherein the substrate comprises a circuit board.

5. The redundant level measuring system of claim 2 further comprising a feed bearing attached to the body operatively engaging a feed end of the antenna so that the body is free to rotate in the housing guided by the antenna.

6. The redundant level measuring system of claim 1 wherein the partition physically isolates the open space from the float.

7. The redundant level measuring system of claim 1 wherein the measurement instrument comprises a micro power impulse radar instrument.

8. The redundant level measuring system of claim 1 wherein the antenna comprises an antenna horn.

9. The redundant level measuring system of claim 1 wherein the antenna comprises a dielectric rod antenna and the radiating element comprises a loop launcher.

10. The redundant level measuring system of claim 1 wherein the radiating element comprises an oscillator circuit including microstrip resonators.

11. A redundant level measuring system comprising:

a chamber for fluidic coupling to a process vessel whereby material level in the vessel equalizes with material level in the chamber;

an elongate partition in the chamber defining a float space and an open space;

a float including a magnet in the chamber float space for rising and falling with material level in the chamber;

a magnet actuated visual indicator mounted to the chamber for indicating level of the magnet in the chamber; and a through air radar measurement instrument including a housing; an antenna secured to the housing; a process adapter associated with the antenna and the housing for securing the instrument to the chamber to define a process seal and with the antenna directed to the chamber open space; a control in the housing for generating or receiving a high frequency signal, the control comprising an electromagnetic radiating element; and a body supporting the radiating element proximate the antenna for rotation at any angular orientation relative to the housing and the antenna without affecting the process seal.

12. The redundant level measuring system of claim 11 wherein the body comprises a substrate rotatably mounted in the housing so that the radiating element can be independently oriented relative to a process vessel.

13. The redundant level measuring system of claim 12 wherein the substrate comprises a circuit board.

14. The redundant level measuring system of claim 11 further comprising a feed bearing attached to the body operatively engaging a feed end of the antenna so that the body is free to rotate in the housing guided by the antenna.

15. The redundant level measuring system of claim 11 wherein the partition physically isolates the open space from the float.

16. The redundant level measuring system of claim 11 wherein the measurement instrument comprises a micro power impulse radar instrument.

17. The redundant level measuring system of claim 11 wherein the antenna comprises an antenna horn.

18. The redundant level measuring system of claim 11 wherein the antenna comprises a dielectric rod antenna and the radiating element comprises a loop launcher.

19. The redundant level measuring system of claim 11 wherein the radiating element comprises an oscillator circuit including microstrip resonators.

* * * * *

UNITED STATES PATENT AND TRADEMARK OFFICE
CERTIFICATE OF CORRECTION

Page 1 of 1

PATENT NO. : 9,557,205 B2
APPLICATION NO. : 13/206714
DATED : January 31, 2017
INVENTOR(S) : Sanders et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1087 days.

Signed and Sealed this
Nineteenth Day of September, 2017

Joseph Matal
*Performing the Functions and Duties of the*
*Under Secretary of Commerce for Intellectual Property and*
*Director of the United States Patent and Trademark Office*